Dec. 27, 1960     G. W. SCHATZMAN     2,966,367
FENDER AND FENDER SHIELD ASSEMBLY
Filed April 30, 1957     2 Sheets-Sheet 1
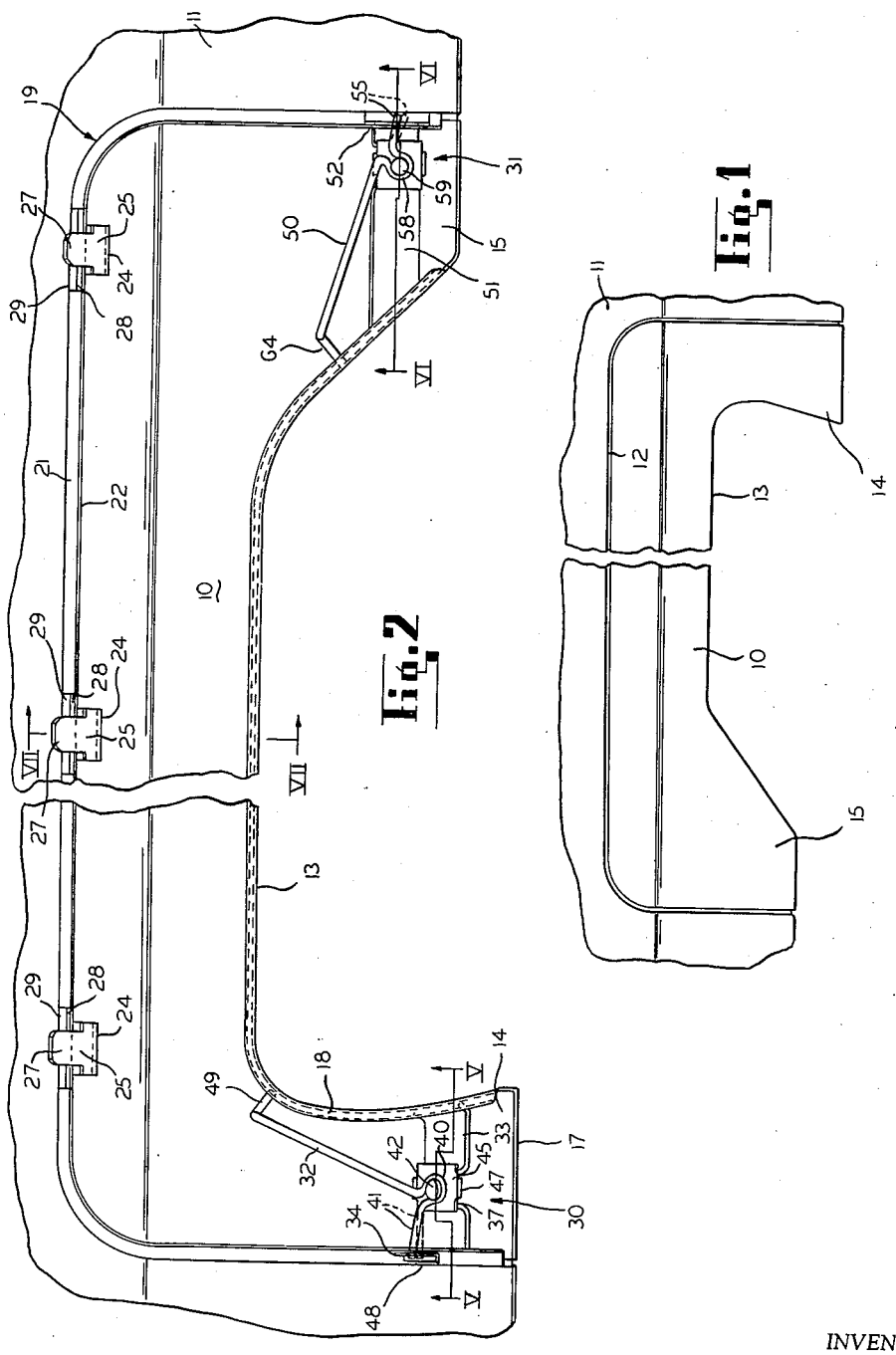
INVENTOR.
GEORGE W. SCHATZMAN
BY
ATTORNEYS

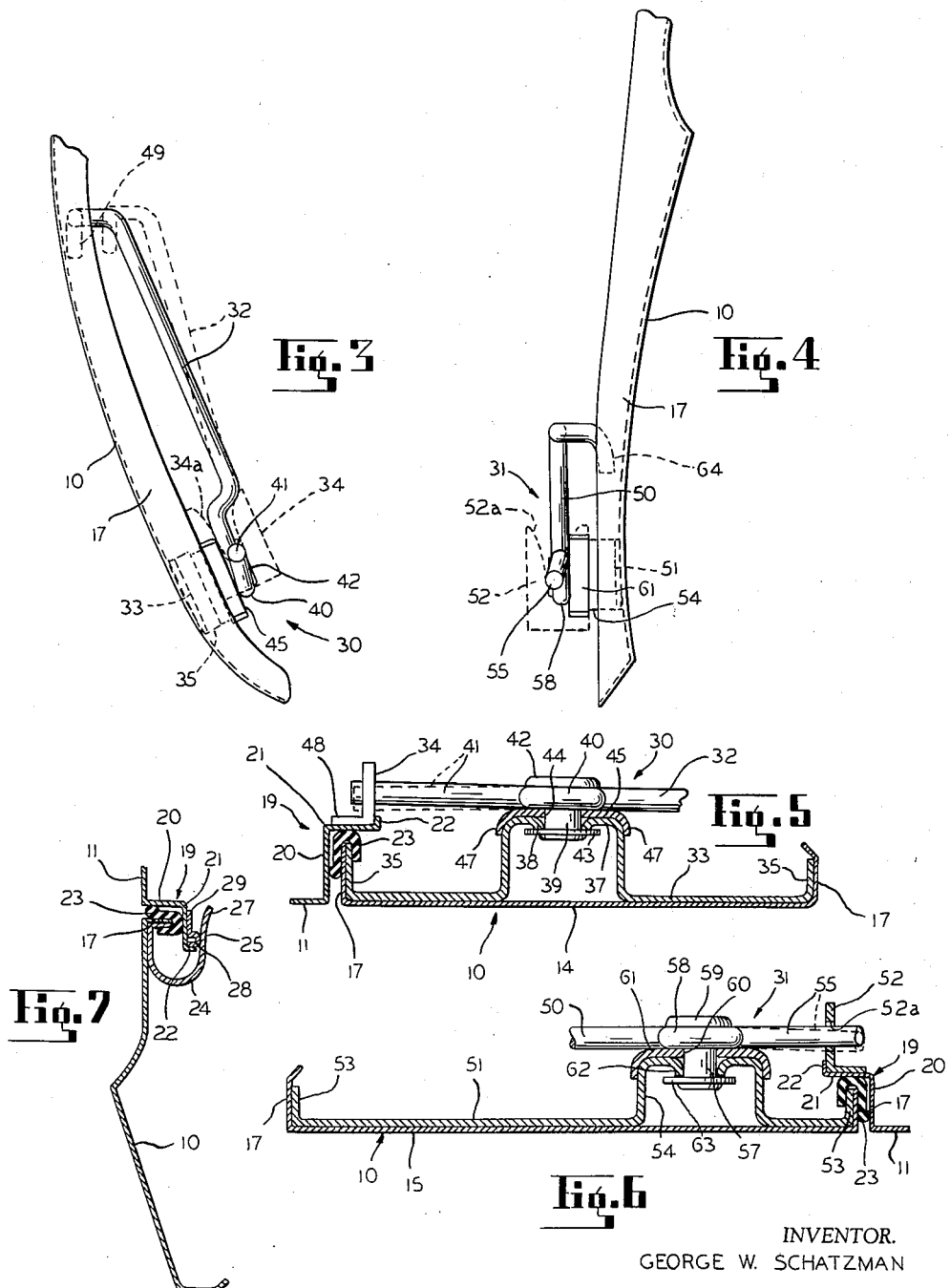

United States Patent Office 2,966,367
Patented Dec. 27, 1960

2,966,367

FENDER AND FENDER SHIELD ASSEMBLY

George W. Schatzman, Detroit, Mich., assignor to Houdaille Industries, Inc., Buffalo, N.Y., a corporation of Michigan Filed Apr. 30, 1957, Ser. No. 656,057

3 Claims. (Cl. 280—153)

The present invention relates to improvements in fender and fender skirt or shield assemblies, and more particularly concerns a novel arrangement for improving the alignment of the fender shield with the fender and for retaining at least portions of the fender shield against undesirable distortion.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in an axial direction. Since this opening inherently presents an unattractive outward appearance, and in high speed operation is an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of substantially covering the opening in the fender or vehicle body and which opening is provided for access to or removal of a vehicle wheel.

Furthermore, as the term "fender" shall hereinafter be employed, it refers to any form of wheel housing or fender in its broad sense, whether such fender be separable from the vehicle body part, partly separable from the vehicle body part, or actually an integral part of the vehicle body, and whether or not it projects outwardly from the principal body portion of the vehicle.

An important object of the present invention is to provide a novel fender and fender shield assembly in which the fender shield is secured to the fender in an improved manner.

Another object of the invention is to provide a fender shield having improved means for attaching the same to a fender.

A further object of the invention is to provide novel structure for detachably securing a fender shield to a fender.

Still another object of the invention is to provide improved retaining means for a fender shield which is especially adapted to effect desirable alignment of the fender shield with a fender in the wheel access opening thereof.

Yet another object of the invention is to provide improved fender shield retaining means constructed and arranged for reinforcing and strengthening the associated portions of the fender shield.

Other objects, features and advantages of the present invention will be readily apparent from the following detailed description of a preferred embodiment thereof, taken in conjunction with the accompanying drawings, in which:

Figure 1 is a fragmental outer side elevational view of a fender and fender shield assembly embodying features of the invention;

Figure 2 is a fragmental but enlarged inner side elevational view of the fender and fender shield assembly;

Figure 3 is a fragmentary rear end elevational view of the fender shield;

Figure 4 is a fragmentary front end elevational view of the fender shield;

Figure 5 is an enlarged sectional detail view taken substantially on the line V—V of Figure 2;

Figure 6 is an enlarged sectional detail view taken substantially on the line VI—VI of Figure 2; and Figure 7 is a sectional detail view taken substantially on the line VII—VII of Figure 2.

Referring to Figures 1 and 2, a fender shield 10 is supported by a fender 11 in closing relation to a wheel access opening 12 therein. In the present instance, the wheel access opening 12 is of more or less rectangular outline and the top and end perimeters of the fender shield 10 are of complementary outline, and with the fender shield panel provided with a downwardly opening recess 13 defined at the front end of the fender shield by a depending narrow leg portion 14 while the rear end of the fender shield opening is defined by a depending leg portion 15. Entirely about the margins of the fender shield is an inturned reinforcing flange 17 which on the portions thereof defining the fender shield recess 13 is provided with an angular turned terminal portion 18 projecting respectively forwardly and rearwardly on the leg portions of the fender shield and upwardly along the upper side of the fender shield opening 13, as best seen in Figure 2.

Entirely about and defining the wheel access opening 12 in the fender 11 is an angularly cross-sectioned reinforcing and fender shield seat flange 19 including an inwardly extending portion 20 angularly projecting from juncture with the body of the fender 11. From the inner extremity of the flange portion 20 extends angularly into the access opening 12 and substantially parallel to the adjacent marginal portion of the fender 11 a flange portion 21. At its distal terminus, the flange portion 21 has an inturned narrow reinforcing and finishing flange extremity portion 22 (Figs. 5, 6 and 7). Through this arrangement, the fender marginal flange 19 provides a substantially rabbet groove opening outwardly and into the wheel access opening and receptive of the upper and end marginal portions of the fender shield 10 and more particularly the inturned marginal flange 17 thereof carrying an embracing rubber or rubber-like sealing gasket 23 which in assembly with the fender of the fender shield sealingly engages the fender marginal flange portions 20 and 21.

For retaining the upper margin of the fender shield panel 10 in place relative to the upper portion of the wheel access opening in the fender, the fender shield carries along the inner side of its upper margin a plurality of resilient retaining spring clips 24 of generally U-shape (Figs. 2 and 7). Each of the retaining clips 24 has one leg shaped generally complementary to the fender shield margin and the inturned marginal flange 17 and secured within the reentrant corner provided by the inturned flange, with an inner spaced second leg 25 extending upwardly opposite the upper edge of the fender shield and having upwardly and inwardly turned cam tip terminal 27 thereon.

In mounting the fender shield 10, it is set into the rabbet groove defined by the fender flange 19 at the opposite ends of the fender access opening and moved upwardly until the upper marginal retaining clips 24 engage with their inner legs 25 behind the fender flange portion 21, or the fender shield is brought with its upper margin canted toward the fender flange 19 so that the retaining clip legs 25 will rock into engagement behind the fender flange portion 21 incident to swinging the fender shield into full wheel access opening closing relation. In either event, the cam lip extremity 27 comes up behind and engages a protective and reinforcing inturned engagement shoulder 28 of a reinforcing plate 29 secured to the center flange portion 21 and with the shoulder 28 projecting inwardly adjacent to the edge of the fender flange terminus 22. This protects the fender flange terminus 22 against possible bending strains due to the substantial grip effected by the retaining clip legs 25 in drawing the margin of the fender shield tightly toward the fender flange portion 21.

For securing the fender shield 10 in place in association with the upper marginal retaining clips 24, is a front end latch structure 30 and a rear end latch structure 31. These latch structures are constructed and arranged to be operative after the fender shield has been assembled with the fender for not only effecting an upward bias on the fender shield but also an inward bias so as to maintain a firm seating of the fender shield margin and more particularly the sealing gasket 23 in the groove provided by the fender marginal flange 19.

Referring to the front end latch structure 30 (Figs. 2, 3 and 5), a stiffly resilient latch rod 32 is pivotally mounted on a supporting bracket plate 33 carried by the fender shield leg 14 and is latchingly engageable with a keeper bracket 34 supported by the adjacent lower end portion of the fender flange 19. The bracket plate 33 is a reasonably heavy gauge plate of steel or the like of substantial width and in elongated bar form with the body portion of the bracket plate lying against the inside face of and extending across the front end leg portion 14 of the fender shield and with respective opposite end flanges 35 on the bracket plate secured as by welding or the like to the opposing face of the inturned fender shield marginal or edge flange 17. Thereby the bracket plate 33 serves as a reinforcing and stiffening brace for the fender shield leg 14.

Intermediate its ends, the bracket plate bar member 33 is provided with an inwardly offset latch rod supporting and spacer journal pedestal 37 provided with a central journal aperture and flange 38. As will be observed in Figures 3 and 5, the peak of the pedestal 37 projects inwardly beyond the innermost edge extent of the fender shield marginal flange 17.

Rotary attachment of the latch rod 32 to the bracket pedestal 37 is effected by means of a bearing pin 39 extending through a journal loop 40 formed in the latch rod 32 and providing juncture between the main or principal body portion of the latch rod and a substantially shorter latching arm 41 thereof. The pivotal or bearing pin 39 may have an integral larger diameter retaining head 42 at one end which in this instance is opposed to the journal loop 40, while the opposite end of the pin carries an applied retaining washer 43 which opposes the turned end of the bearing flange 38. Substantially cant-free bearing for the pin 39 is provided by the reasonably sized inner end portion of the bearing flange 38, and an edge defining a bearing aperture 44 in a bearing plate 45 seated upon the crown of the pedestal 37 and having turned retainer flanges 47 at its several margins to maintain the bearing plate in coaxial bearing registration. This, in effect, provides axially spaced bearings for the shank of the screw 39.

Before the fender shield 10 is latched in place, the latch rod 32 is disposed in an unlatched position wherein the long body arm thereof is swung down from the latched position shown in Figures 2 and 3 so that the latching arm 41 is swung up and clear from the adjacent margin of the fender shield. Then, after the fender shield has been placed in position in the wheel access opening 12, the handle arm portion of the latch rod 32 is swung up so as to swing the latch arm 41 down into a generally upwardly opening keeper notch or slot 34a in the keeper bracket 34 which is secured by means of an angular base flange 48 to the fender flange portion 21 and projects inwardly therefrom for receiving the latch arm 41. The construction and disposition of the keeper notch 34a is such that as the latch arm 41 is engaged therein the arm is tensioned and resiliently flexed inwardly as indicated from a non-latching dash line position in Figure 5 to the full line position shown. This effects a counteracting inward drawing and clamping action of the adjacent fender shield margin and more particularly the flange 17 and the gasket 23 thereon toward and into the rabbet groove in the fender marginal flange 19 and more particularly the angular flange portion 21 thereof. Furthermore, the bottom of the notch 34a is so located with respect to the latch arm 41 that in the final increment of latching movement of the long handle portion of the latch rod 32 a substantial tensioning of the latch arm 41 is effected and maintained by engaging a retaining or interlock latch lug terminal 49 angled from the latch handle over and past the turned up terminal flange portion 18 and into retaining engagement with the marginal flange 17 of the fender shield. In effecting this, the long handle portion of the rod 32 is adapted to be sprung resiliently flexibly inwardly as indicated in dash outline in Figure 3 to clear the interlock lug 49 past the fender shield flange 17 for seating on the flange as shown in full line in Figures 2 and 3 by springing outwardly of the rod handle portion. In such final increment of the latching interengagement of the latch rod 32, the latch arm 41 is stopped short of normal down swinging movement thereof and is held under tension in the full line position shown in Figures 2 and 3 as contrasted to the dash line normal position in Figure 2. As a result, an upward thrust is imposed upon the associated end portion of the fender shield 10 which drives the upper margin of the fender shield firmly into the upper portion of the fender flange 19.

At the opposite or rear end portion of the fender shield the structure and operation of the latching assembly 31 is much the same as just described in connection with the latching assembly 30 at the front end portion of the fender shield. To this end, having reference to Figures 2, 4 and 6, the latching assembly 31 includes a resilient latch rod 50 carried by a bracket plate bar 51 and engageable in latching relation with a keeper bracket 52 carried by the fender flange 19. At its opposite ends, the substantial width rigid bar 51 is secured by means of turned in flanges 53 to the fender shield flange 17 with the outer face of the bar 51 bearing reinforcingly against the opposing inner face of the fender shield rear leg portion 15. An offset pedestal portion 54 of the supporting bracket bar 51 is located adjacent the rear end portion thereof so that a short latching arm 55 of the latch rod can be swung into and out of an upwardly opening latching notch 52a of the bracket 52 by swinging of the latch member 50 about the axis of a pivot or bearing pin 57 extending through a journal loop 58 at juncture of the latch arm 55 with the handle portion of the latch member. The pin 57 has an integral retaining head 59 at one end bearing against the latch member journal loop 58 while the shank of the pin extends through a bearing aperture 60 of a bearing washer plate 61 and an inturned bearing flange 62 providing a bearing aperture in the center of the pedestal portion 54. A bearing collar washer 63 is attached to the distal or outer end portion of the bearing pin 57.

Operation of the latch member 50 is effected similarly as the latch member 32 in that initially the latch member 50 is swung about the pivot 57 to have the latch arm 55 extend upwardly clear of the margin of the fender shield. Then when the fender shield is generally located in assembled relation with the fender, the handle portion of the latch member 50 is swung up to thereby swing the latch arm 55 down into the keeper bracket notch 52a wherein the latch arm 55 is placed under inwardly deflected tension as indicated on comparison of the full line and dash line positions in Figure 6, and is also placed under upwardly thrusting tension as indicated on comparison between the normal dash line position in Figure 2 and the full line tensioned latching position in Figure 2. In the final latching position of the member 50, an interlock offset lug 64 on the free extremity of the latch handle portion is interlockingly engaged with the fender shield flange 17 as shown in Figure 2. Thereby the rear end portion of the fender shield is not only drawn tightly inwardly into snug seating engagement within the member flange 19 but is also thrust firmly upwardly into the fender flange in the upper portion of the wheel access opening 12.

For removing the fender shield 10, the respective latch members 32 and 50 are released by springing the handle portions thereof free from the fender shield flange 17 and by swinging the handle portions down releasing the respective latching arms 41 and 55 from the respective keeper brackets 34 and 52. Then the fender shield can be removed by dropping or pulling the same down and away from the fender 11 upon disengagement of the upper marginal retaining clips 24 by the downward and outward movement of the fender shield.

It will thus be apparent, that although the fender shield panel 10 may be of substantial length and weight, it is effectively supported and clamped and latched in place on the fender 11. Moreover, the retaining spring clips or fingers 24 and the latch assemblies 30 and 31 assure that the fender shield is retained in the desirable flush relation on its outer face to the outer face of the fender. In addition, the latch supporting bracket plate bars help to maintain the fender shield and more especially the end portions thereof free from distortion and also help the fender shield panel to line up better with the fender.

It will be understood that modifications and variations may be effected without departing from the scope of the novel concepts of the present invention.

I claim as my invention:

1. In a fender and fender shield assembly including a fender having a wheel access opening defined by an inturned reinforcing flange, and a fender shield panel for substantially closing the wheel access opening, means for retaining the fender shield in assembled relation to the fender including a generally U-shaped resilient finger member secured to the inner side of the top margin of the fender shield panel and having an inwardly spaced upwardly projecting resilient retaining arm, the fender having a flange portion engageable within said finger, and a reinforcing member carried on the inner side of said flange portion and provided with a bearing rib projecting inwardly and engageable tensionably by said resilient finger.

2. In a fender shield construction, a fender shield panel, a latch supporting bar carried by said panel and having an offset latch supporting portion provided with an aperture defined by a turned bearing flange, a bearing washer member carried by said offset portion and having a bearing aperture therein coaxially aligned with the offset portion flange defined bearing aperture and cooperating with said flange to provide axially spaced bearings, a latch member, and a bearing pin extending through said bearings and connecting said latch member rotatably to said offset portion.

3. In a fender and fender shield assembly, a fender having a wheel access opening defined by a rabbet groove inset angular marginal flange, said flange carrying a bracket plate member projecting inwardly and providing an upwardly opening keeper notch or slot therein, a fender shield for closing said wheel access opening and having a marginal flange structure for seating in said rabbet groove, and a reinforcing bar carried by the inner side of said fender shield and having a manually operable releasable latch including an arm engageable retainingly in said keeper notch.

References Cited in the file of this patent
UNITED STATES PATENTS

| | | |
|---|---|---|
| 2,048,862 | Haltenberger | July 28, 1936 |
| 2,161,160 | Harroun et al. | June 6, 1939 |
| 2,196,493 | Fergueson et al. | Apr. 9, 1940 |
| 2,314,651 | Claud-Mantle | Mar. 23, 1943 |
| 2,560,601 | Schatzman | July 17, 1951 |
| 2,609,218 | Van Antwerp | Sept. 2, 1952 |
| 2,761,698 | Schatzman | Sept. 4, 1956 |